United States Patent
Adkins et al.

(10) Patent No.: US 9,192,881 B2
(45) Date of Patent: Nov. 24, 2015

(54) WATER BASIN AND SYSTEM

(71) Applicant: Hearth Products Controls, Kettering, OH (US)

(72) Inventors: Michael S. Adkins, Vandalia, OH (US); Patrick W. Schatz, Tipp City, OH (US); Gregory T. Steck, Ludlow Falls, OH (US)

(73) Assignee: HEARTH PRODUCTS CONTROLS CO., Kettering, OH (US)

(*) Notice: Subject to any disclaimer, the term of this patent is extended or adjusted under 35 U.S.C. 154(b) by 333 days.

(21) Appl. No.: 13/834,839

(22) Filed: Mar. 15, 2013

(65) Prior Publication Data
US 2014/0262992 A1 Sep. 18, 2014

(51) Int. Cl.
| | |
|---|---|
| *B65D 90/04* | (2006.01) |
| *B65D 90/14* | (2006.01) |
| *B65D 90/22* | (2006.01) |
| *B01D 35/02* | (2006.01) |
| *B01D 35/14* | (2006.01) |
| *B01D 35/28* | (2006.01) |
| *C02F 1/00* | (2006.01) |
| *E03B 11/02* | (2006.01) |
| *B01D 35/027* | (2006.01) |
| *B05B 17/08* | (2006.01) |
| *E04H 4/00* | (2006.01) |
| *E04H 4/14* | (2006.01) |
| *A63G 21/18* | (2006.01) |

(52) U.S. Cl.
CPC ............... *B01D 35/02* (2013.01); *A63G 21/18* (2013.01); *B01D 35/0273* (2013.01); *B05B 17/08* (2013.01); *E04H 4/0018* (2013.01); *E04H 4/14* (2013.01); *B65D 90/041* (2013.01); *B65D 90/143* (2013.01); *C02F 1/001* (2013.01)

(58) Field of Classification Search
CPC ............ E03C 1/04; E03C 1/044; E03C 1/12; E03C 1/14; E03C 1/32; B60P 3/22; B60P 3/2205; B60P 3/2225; B60P 3/2295; B65D 90/00; B65D 90/004; B65D 90/04; B65D 9/041; B65D 90/12; B65D 90/14; B65D 90/143; B65D 90/22; B65D 90/26; B65D 90/48; B01D 35/02; B01D 35/14; B01D 35/28; B01D 35/027; B01D 35/0276; B01D 21/24; B01D 21/2405; B01D 21/2444; C02F 1/001; E03B 11/00; E03B 11/02; E03B 11/04; E03B 11/10; E03B 13/00; E03B 13/02
USPC ............ 210/97, 121, 257.1, 123, 416.1, 258, 210/90, 104, 86, 541, 542, 513, 523–528; 137/259, 396–399, 409, 565.01, 571, 137/590, 590.5, 593; 220/565–567, 501, 220/505, 88.1

See application file for complete search history.

(56) References Cited

U.S. PATENT DOCUMENTS

| | | | | | |
|---|---|---|---|---|---|
| 2,495,397 | A | * | 1/1950 | Weber | ............................. 38/77.6 |
| 3,102,799 | A | * | 9/1963 | Kiekhaefer | ..................... 96/157 |
| 3,483,979 | A | * | 12/1969 | Messa et al. | .................... 210/94 |
| 4,072,168 | A | * | 2/1978 | Wittenmyer | ............. 137/565.33 |

(Continued)

*Primary Examiner* — Joseph Drodge
(74) *Attorney, Agent, or Firm* — Thompson Hine LLP

(57) ABSTRACT

Various water basins and systems are described that include a first basin having a longitudinally upward extending tower, a first side, a second side, and a plurality of supports. The plurality of supports are adjustable from the first side of the first basin. The system includes at least a water system having a pump and a water line that extends from the pump to the second side of the first basin.

20 Claims, 5 Drawing Sheets

(56) References Cited

U.S. PATENT DOCUMENTS

| | | | |
|---|---|---|---|
| 4,367,145 A * | 1/1983 | Simpson et al. | 210/241 |
| 4,387,020 A * | 6/1983 | Hill | 210/86 |
| 4,489,846 A * | 12/1984 | Nickel | 220/632 |
| 4,601,509 A * | 7/1986 | Ellis, Sr. | 296/22 |
| 4,743,382 A * | 5/1988 | Williamson et al. | 210/786 |
| 4,764,272 A * | 8/1988 | Fox, Sr. | 210/104 |
| 5,804,062 A * | 9/1998 | Wyness | 210/86 |
| 5,833,295 A * | 11/1998 | Farlow, Jr. | 296/22 |
| 6,106,704 A * | 8/2000 | Drewery | 210/86 |
| 6,345,852 B1 * | 2/2002 | McCarthy | 296/22 |
| 7,172,231 B1 * | 2/2007 | Johnson, II | 296/22 |
| 2003/0010691 A1 * | 1/2003 | Broussard | 210/170 |
| 2005/0029425 A1 * | 2/2005 | Garton | 248/346.01 |
| 2006/0175240 A1 * | 8/2006 | Clark et al. | 210/241 |
| 2007/0221565 A1 * | 9/2007 | Benscoter | 210/416.3 |

\* cited by examiner

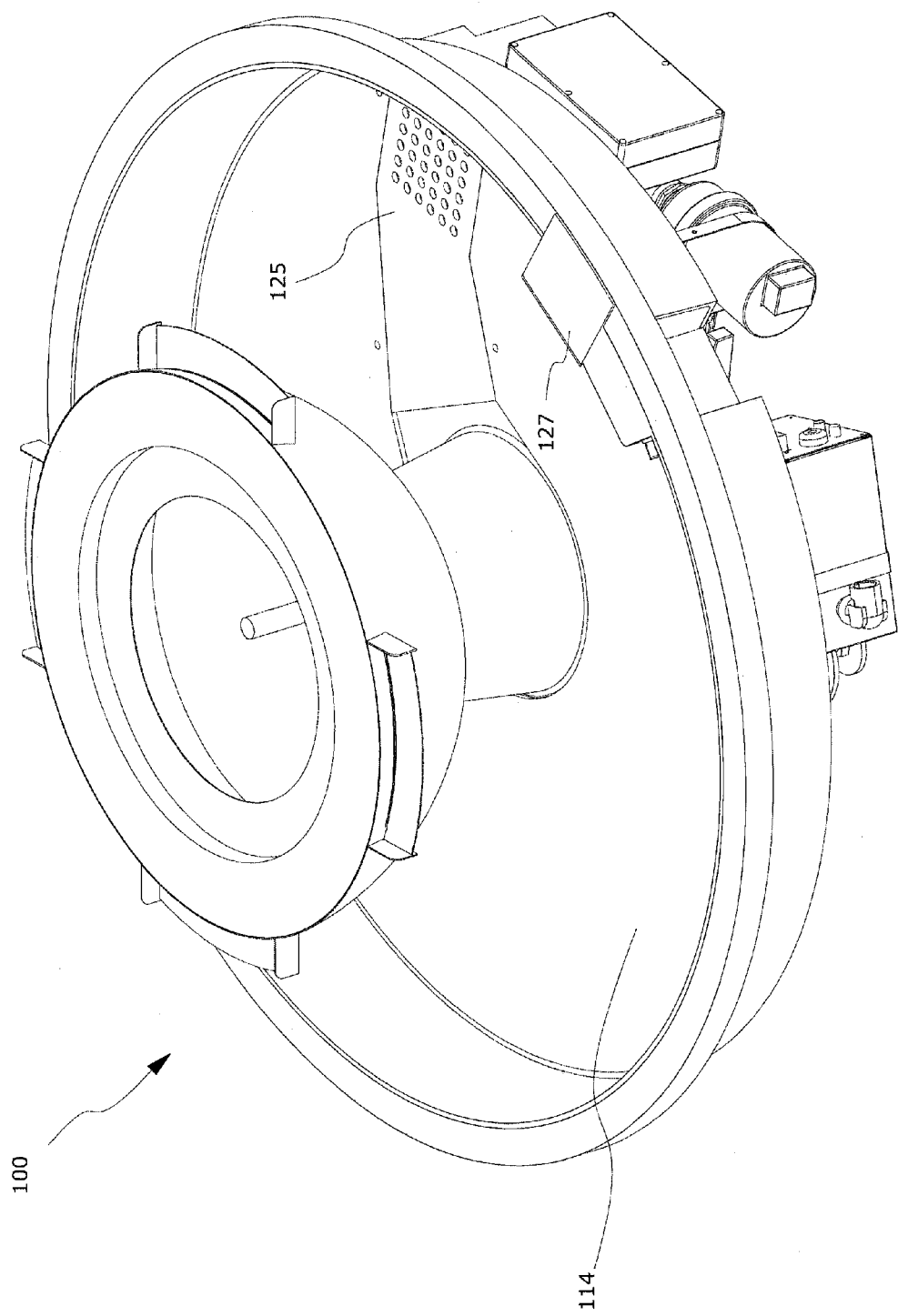

WATER BASIN AND SYSTEM

TECHNICAL FIELD

The present invention relates to a basin and system and more particularly a water basin and system having at least a preconfigured water system and an adjustable basin.

BACKGROUND

Water systems are typically installed or integrated as part of a structure designed to receive and support the basin of a water system. These water systems require on-site work, including on-site design and installation of various lines, valves and controls. Further, these water systems require on-site connections of water, gas, and/or electrical lines and systems and these systems are not portable or adjustable. The on-site work adds unpredictable amounts of time and installation costs and the systems cannot be installed in environments having rough or uneven support surfaces.

Accordingly, an improved water basin and system is desired that includes at least a preconfigured water system that includes an adjustable base for installation in unpredictable environments, including environments having rough and uneven support surfaces.

SUMMARY

Water basins and systems are disclosed. In one aspect, an apparatus is provided that includes a basin having a bottom, sidewall, a plurality of leveling supports, a bottom side, a top side, and a first passageway. The passageway extends from the bottom side to the top side. Further the plurality of leveling supports adjustably extend from the bottom side of the basin. The apparatus further includes a tower that includes first and second ends and a second passageway extending between these first and second ends. Here the tower extends upward from the bottom of the basin. The first and second passageways are substantially aligned. The apparatus also includes a water system and an electrical system. The water system includes at least a pump, a first water line, a second water line, and a water filter housing. Here the pump is securely connected to the bottom side of the basin and the first water line extends from the pump to the second passageway of the tower. Further, the second water line extends from the water filter housing to the pump. The electrical system is securely connected to the bottom side of the basin and it controls the pump.

In another aspect, a water basin and system is disclosed. The basin and system includes a concave water basin having a at least one tower extending upward from a bottom of the water basin, a bottom side, a top side, a plurality of leveling supports, and a passageway. The passageway extends from the bottom side of the concave water basin through the tower. Further, the plurality of leveling supports are adjustable from the bottom side of the concave water basin. The basin and system further includes a water system and an electrical system. The water system includes at least a pump, at least a first water line, and a water filter housing. Here the pump is securely connected to the concave water basin and the at least first water line extends from the pump to at least the passageway. Further, the electrical system controls at least the pump and the electric system is securely connected to the concave water basin.

A water system is another aspect disclosed. The system includes a first basin having a longitudinally upward extending tower, a first side, a second side, and a plurality of supports. The plurality of supports are adjustable from the first side of the water basin. The system includes a water system having a pump, a water line, and a water filter. Here the water line extends from the pump to the second side. Further, the system includes a fuel system that has a gas valve, a flame control system, and a gas line. The fuel system is securely connected to the first side of the water basin and the gas line extends from the fuel system to the second side of the first basin. The electrical system controls at least the water system and the fuel system.

Advantages and features of the invention will be apparent from the following description of particular embodiments and from the claims

BRIEF SUMMARY OF THE FIGURES

FIG. 1B is an isometric view of a water basin and system illustrated in FIG. 1A where the water basin includes a liner.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Figure 1A:
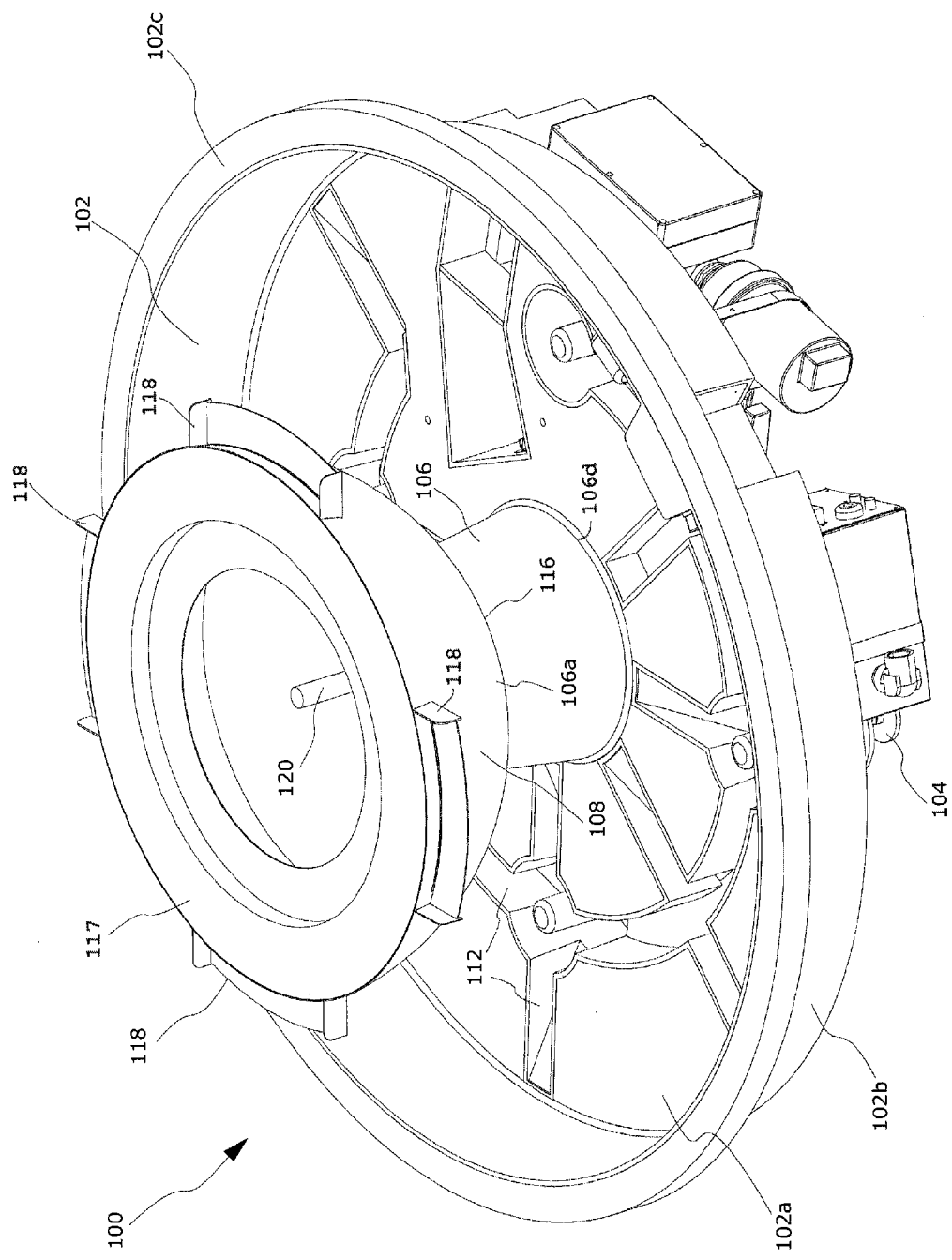
FIG. 1A is an isometric view of a water basin and system.

Referring to FIG. 1A, a first embodiment of a water basin and system 100 is shown. Water basin and system 100 includes a water basin 102, e.g., a first basin, having at least one gusset 112 (may be optional) and further having one or more leveling supports 104, tower 106, and a water feature 108 mounted on tower 106. The water basin has a first side and a second side, e.g., a first side is a top side of the water basin and a second side is a bottom side of the water basin. In one embodiment, the water feature is optional and/or may be supplied by the customer. As discussed herein, installation time is minimized because the basin and system 100 is preconfigured with at least one of the following: a water system, an electrical system, a lighting system, a fuel system, and a control system. In another embodiment, the water basin and system is designed of materials and has a size that makes it portable. In yet another embodiment, the water basin and system can be installed in a location and later moved to another location because of the preconfigured system(s) discussed herein. The water basin and system 100 is considered a complete, plug-and-play, preconfigured system because a user/person can install the system, fill it with water, and plug into a power source and then start using the system quickly. In another embodiment, the water basin and system includes a battery supply and the like.

In the illustrated embodiment, water basin 102 includes a bottom 102a and a sidewall 102b having an optional upper flange 102c. Bottom 102a and sidewall 102b form an upward facing, circular, concave basin configured to hold at least a liquid, e.g., water and the like. In another embodiment, the water basin includes a bottom and one or more sidewalls forming an upward facing basin having an alternative shape, including but not limited to a triangle, square, rectangle, octagon, and the like. In yet another embodiment, the water basin includes a bottom and one or more sidewalls forming an irregular or non-uniform shape.

In the illustrated embodiment, tower 106 extends upward from bottom 102*a* of water basin 102, e.g., a longitudinally upward extending tower. Tower 106, e.g., a basin tower, is configured to extend upward to form an inner edge of a water envelop that is further defined by bottom 102*a* and sidewall 102*b* of water basin 102. In the illustrated embodiment, tower 106 extends above the height H1 of sidewall 102*b*. In another embodiment, the tower extends less than or equal to the height of the sidewall.

Figure 2:
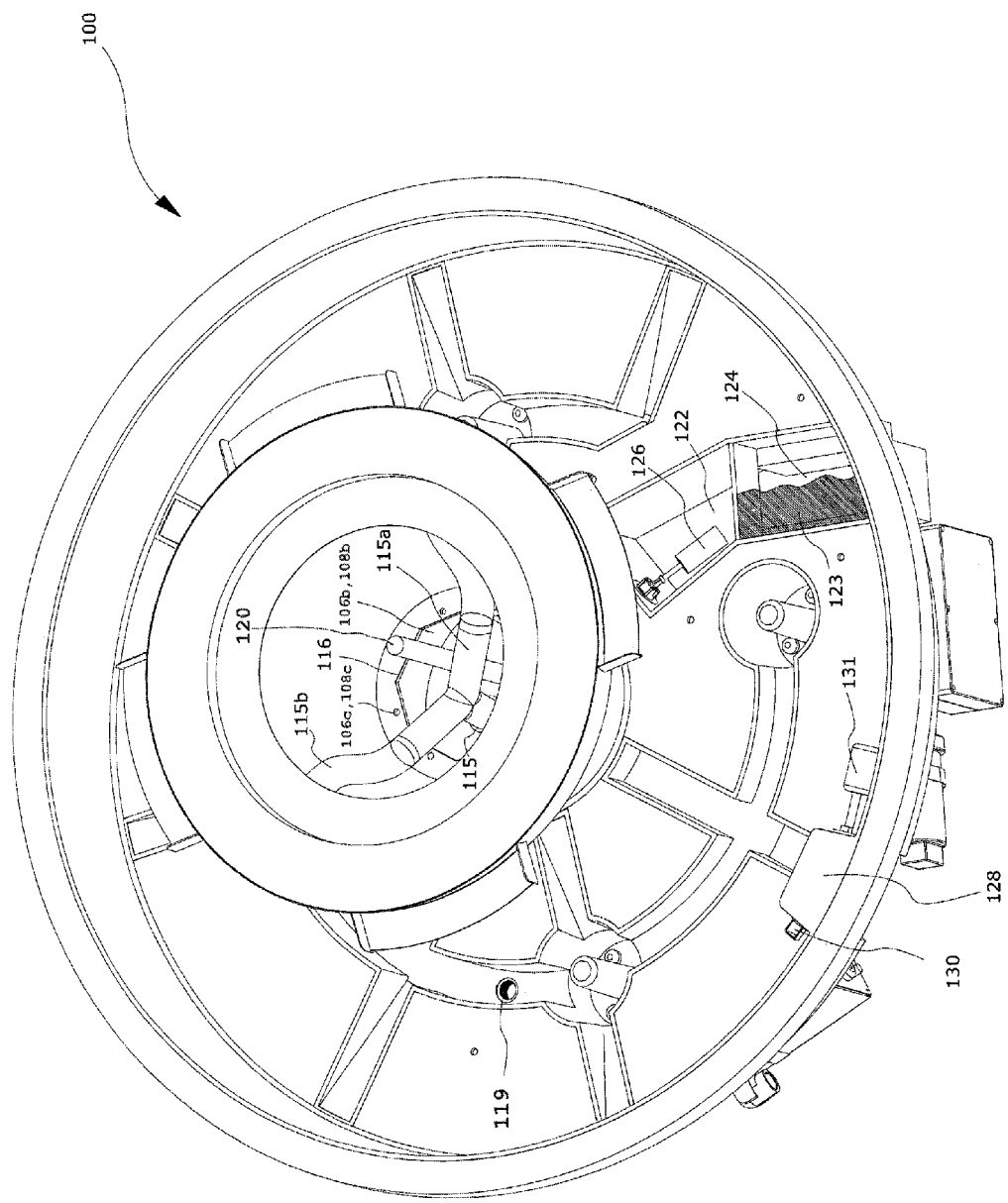
FIG. 2 is a top isometric view of the water basin and system illustrated in FIG. 1A.

In the illustrated embodiment and further illustrated in FIG. 2, tower 106 includes a first end 106*a* having an opening or aperture 106*b*. This first end 106*a* or top of tower 106 includes a connection area, e.g., a flat area, and at least one fastening or through hole 106*c* providing a platform to securely connect at least one water feature 108 to tower 106. For example, first end 106*a*, on an upper end of tower 106, includes a plurality of fastening holes 106*c* that are configured to receive threaded fasteners, rivets, and the like to securely connect water feature 108 to tower 106. In the illustrated embodiment, opening or aperture 106*b* extends from first end 106*a* to second end 106*d* of tower 106 and provides a passageway that allows access between the top and bottom of the water basin and system. The passageway 106*b* in tower is substantially aligned with a passageway 102*d* in water basin 102. In one embodiment, the passageway formed by water basin and tower is one discrete passageway and in another embodiment there are two or more discrete parts that form the passageway, e.g., a first passageway and a second passageway substantially aligned. The opening or passageway 106*b* in tower 106 provides a discrete internal passageway or conduit where the system components can be routed in a hidden fashion, i.e., out of view from the top view. For example, the opening or passageway allows for preconfigured fluid lines and connections (e.g., water and gas), electrical lines and connections, and/or the like to be routed between the bottom side and top side of the water basin. In another embodiment, the water basin, the tower, and/or the water feature may be configured to include a coupling, conduit, or the like to provide a passageway between the bottom and top of the water basin. In another embodiment, the first end of the tower is welded or riveted to the water feature. In yet another embodiment, at least one tower may extend from one portion of the basin, e.g., from one or more bottom locations.

In the illustrated embodiments, tower 106 is integrally formed with basin 102, e.g., basin and tower are integrally formed using a rotational molded process, e.g., polyethylene, polycarbonate, or urethan materials may be used. In another embodiment, the tower and the basin are made using a casting process or an injection molding process. In another embodiment, at least the lower second end of the tower is configured to mechanically attach, e.g., bolt, rivet, weld, etc., to at least one portion of the water basin, including the bottom, at least one sidewall, or to both the bottom and at least one sidewall of the basin. In yet another embodiment, the tower and the water basin connection includes a liquid tight seal. In another embodiment, the tower and the water feature are integrally formed as one or more parts that are securely attached to the water basin. In another embodiment, the water effect may include more than one tower and/or more than one water effect and/or water feature.

In the illustrated embodiment, water feature 108 has an upward facing, concave circular shape, e.g., the shape of a bowl or a half sphere, that extends upward from tower 106. Water feature 108 includes a first end 116 (e.g., a lower end) that is attached to tower 106 (as discussed above). As illustrated in FIG. 2, water feature 108 includes an opening or aperture 108*b* and at least one through hole 108*c* that are substantially aligned with opening 106*b* and through holes 106*c*, respectively, in tower 106. Water feature 108 further includes at least one water inlet (not shown) and a second end 117 (e.g., an upper end) having four scuppers 118, i.e., water outlets, water openings, water slots, water spouts, and the like, that extend radially outward from water feature 108. The at least one water inlet and at least one scupper of water feature 108 are fluidly connected to a preconfigured water system as discussed further herein.

In the illustrated embodiment, four scuppers 118 are equally spaced on the perimeter of the upper second end 117 and are in fluid communication with the water system discussed herein. In another embodiment, the water feature may include at least one scupper that extends three-hundred and sixty degrees around the perimeter of the water feature. In yet another embodiment, the at least one water outlet or scupper circumferentially extends along at least a portion of the outer surface of the water feature. In another embodiment, the water feature may include more or less scuppers that what are illustrated in FIG. 1A. In yet another embodiment, the basin and system may include a water feature where scuppers extend radially outward from another location, i.e. any position between the first end and second end of the water feature. In another embodiment, the water feature is optional to the water basin and system or provided by the customer. In yet another embodiment, the water feature includes scuppers or water outlets that have at least one of the following contours: linear, curvilinear, and cascading. In another embodiment, the water feature may be configured to hold at least one of the following: fire effect, water, flowers, plants, statues, and the like.

In the illustrated embodiments, water feature 108 is configured to include an optional fire feature or fire/pit container (not shown) that is configured to contain at least one of the following media: glass, lava rock, and the like. In another embodiment, the water feature is configured to hold another water effect and/and or a water scupper.

In the illustrated embodiment, water scupper 118 is open to atmosphere, therefore, the water outlet or scupper provides a water effect, e.g., a waterfall effect that directs water back into water basin 102. In another embodiment, at least one scupper may be fluidly connected to another water feature (e.g., another tier of water features) or to a manifold that includes one or more outlets that open to atmosphere or to an inlet of another basin and the like. In yet another embodiment, the water feature includes a cascading water effect.

In yet another embodiment, the water feature may include another upward facing, concave shape, including but limited to a square, rectangle, oval, star shape, and/or an irregular shape. In another embodiment, the water feature may be supported by two or more towers. In another embodiment, the basins, tower, and/or the water effect may include lighting effects, sound effects or speakers, and other electrical accessories. These effects may also be referred to as features.

In the illustrated embodiment, water feature 108 includes an optional fire pit holding feature and includes a preconfigured gas supply line 120 fluidly connected to a fuel system configured to connect to at least one fuel source, e.g., natural gas, propane, and the like. For example, gas line 120 may be fluidly connected to a gas valve and may include a flame control system, including but not limited to a hot wire ignition, a pilot flame, and a thermocouple flame detector. In the illustrated embodiments of FIGS. 1A-3, gas line 120 extends from the bottom side of basin 102, up through the passageway or opening of tower 106 and water feature 108 to a position that is a distance below upper second end 117 of water feature 108. This distance is preconfigured based on flame media properties, including media density and the like. In another embodiment, the gas line may be preconfigured to include more than one outlet, e.g., a manifold, that may be at one or more distances from the top of the water feature.

In another embodiment, the water feature is configured to hold a plant, bush, flowers, and other types of plants and the water feature includes another water line and the like that is configured to periodically water the plant(s). Further, the water feature may include an overflow to remove excess water such as rain that may collect in the water feature. In another embodiment, the water feature is configured to hold a statue or some other object and may include a drain to allow rain water and the like to flow out of the water feature and the like.

In one embodiment, the water basin, the tower, and the water feature discussed herein may be made from metals, plastics, and light weight concrete reinforced materials. In another embodiment, the water basin, the tower, and the water feature discussed herein may be made from at least one type of polyethylene (low, medium, and/or high density), new/used/recycled materials, polyurethane, polycarbonate, and the like. For example, the materials may include fiberglass and light weight concrete, GFRC lightweight concrete, and the like.

In another embodiment, a water tank is fluidly connected to the water basin.

FIG. 1B illustrates water basin and system 100 having liner 114 covering basin bottom so that structural features, including gussets and the like, are hidden from view. Liner 114 may cover at least a portion of the bottom, providing a smooth surface to support decorative media, e.g., stone, gravel, and the like. Liner 114 may be made from at least one of the following materials: metals including aluminum, steel, copper, and the like, plastic and the like. In the illustrated embodiment, liner 114 covers the entire bottom of basin, except for filter cover 125. In another embodiment, the liner may cover the entire bottom of the basin. Further illustrated in FIG. 1B is cover 127 that is securely connected to basin 102 to protect the liquid sensor and/or float sensor discussed further herein.

FIG. 2 illustrates a top isometric view of the water basin and system 100 where the water basin 102 does not include the liner discussed above. In the illustrated embodiment, water basin 102 further includes a tank 122 having low level sensor 126 and filter housing 124 housing filter 123. Tank 122 is a water collection point fluidly connecting the pump (discussed herein) and the water basin. Water is supplied from the water basin 102 and tank 122, through filter 123 and filter housing 124 to the pump (discussed herein) that supplies filtered water to the at least one water feature 108, e.g., at least one water scupper. In the illustrated embodiment, filter housing 124 holds filter 123 (e.g., a washable and reusable filter) and low level sensor 126 is a float type sensor that turns the pump off if the liquid/water level drops below a minimum level. In another embodiment, the filter is disposable or of another design. In yet another embodiment, the low level sensor may be a pressure transducer that indicates the liquid level in the tank, e.g., a minimum or maximum level and the like. The filter housing 124 and filter 123 may be protected by a cover 125 (illustrated in FIG. 1B) having a plurality of apertures, openings, slots, and/or the like.

Further, water basin 102 includes auto fill compartment 128 and overflow 130. The a valve 131a is fluidly connected to a water supply (discussed herein) and includes a liquid sensor 131, e.g., a float sensor, that opens a valve 131a (shown in FIG. 4) to supply water to basin 102 when the water level falls below a minimum level and closes the valve when the level reaches a maximum level. The overflow 130 includes at least one aperture that drains excess liquid out of the water basin. In another embodiment, excess water simply flows over the sidewall of the basin.

In the illustrated embodiment, the water basin and system 100 includes a drain plug 119 that may be used for servicing and winterization of the system. In another embodiment, the water basin and system may not include an auto fill compartment.

Figure 3:
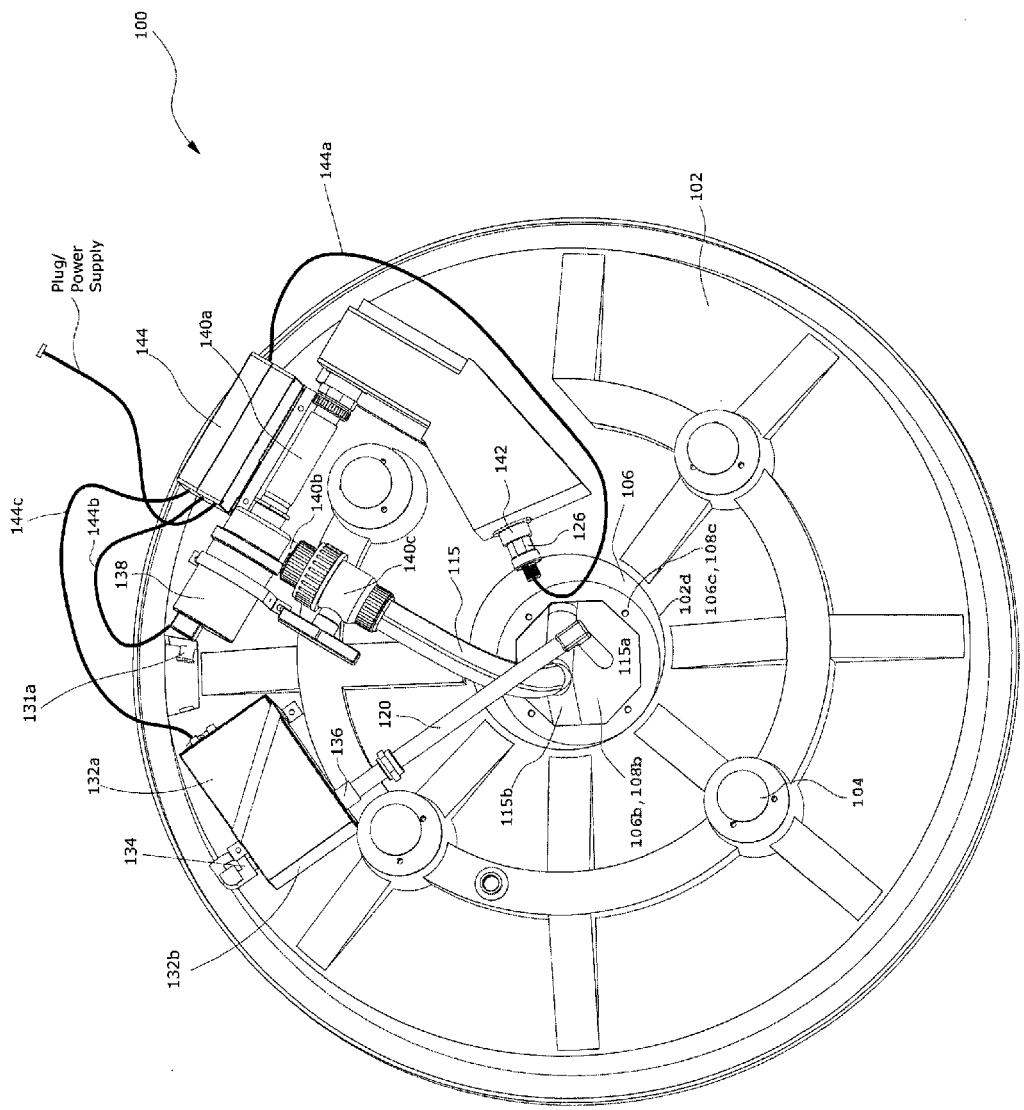
FIG. 3 is a bottom isometric view of the water basin and system illustrated in FIGS. 1A-2.

FIG. 3 illustrates a bottom isometric view of the water basin and system 100, illustrating the bottom of basin 102, tower 106, tower opening 106b and basin opening 108b, hot wire ignition gas control valve 132a (not shown in detail, covered in figure by gas control box) gas controller 132b, pump 138, and electrical junction box 144, all securely assembled on the bottom of water basin 102. In another embodiment, the gas control valve and box, the pump, and/or the electrical junction box may be assembled adjacent or in proximity to the water basin and system, fluidly and/or electrically in communication with the water basin and system. In the illustrated embodiment, hot wire ignition gas control valve 132a includes a gas inlet 134 that is configured to fluidly connect to a gas supply (not shown) and gas outlet 136 fluidly connected to gas line 120 discussed herein. The preconfigured gas control valve 132a is adjustably controlled (from 0% to 100% open, fail close design) by gas controller 132b to regulate gas supply to the fire effect. In another embodiment, the gas controller also controls operation of the igniter and pilot flame and monitors a thermocouple flame detector (not shown).

In the illustrated embodiments of FIG. 1A-3, pump 138 is in fluid communication with an inlet pipe 140a connected to tank 122 (discussed above) and outlet pipe 140b and valve 140c is fluidly connected to water line 115. For example, pump 138 and valve 140c are fluidly connected to a fluid lines 115, 115a, and 115b (tube, pipe, and the like), as illustrated in FIGS. 2-3 for example. The pump 138 pressurizes water and pumps water through line 115, lines 115a-b, and into the at least one water inlet (not shown) of the at least one water feature, and out the water scupper 118. In another embodiment, the at least one inlet is above the at least one outlet or scupper. Pump 138 and/or valve 140c controls liquid flow rates to the at least one water feature 108 and associated piping/tubing (115, 115a, and 115b). In another embodiment, the pump may be fluidly connected to one or more water lines (a manifold) that are in fluid communication with one or more water features and the like. In the illustrated embodiment, low level sensor 126 is connected to tank 122 via coupling 142, e.g., a spin weld fitting, threaded coupling, or the like.

In the illustrated embodiment, electrical junction box 144 includes an electrical power cord or the like that can be connected to a power source. Electrical junction box 144 is in electrical communication with the water basin and system 100, including but not limited to at least one of the following: a first electrical connection 144a electrically connected with low level sensor 126, a second electrical connection 144b electrically connected with pump 138, and a third electrical connection 144c electrically connected with gas controller 132b and/or hot wire ignition gas control valve 132a. Electrical junction box 144 includes pre-wired electrical connections, controls, and the like. Further, electrical junction box 144 is a water tight rated design. In another embodiment, the electrical junction box is adapted to connect to lighting systems, sound systems, and the like.

In the illustrated embodiment, water inlet 131a may be connected to a water supply to fill water manually or automatically. In another embodiment, a user manually fills the water basin when needed.

Figure 4:
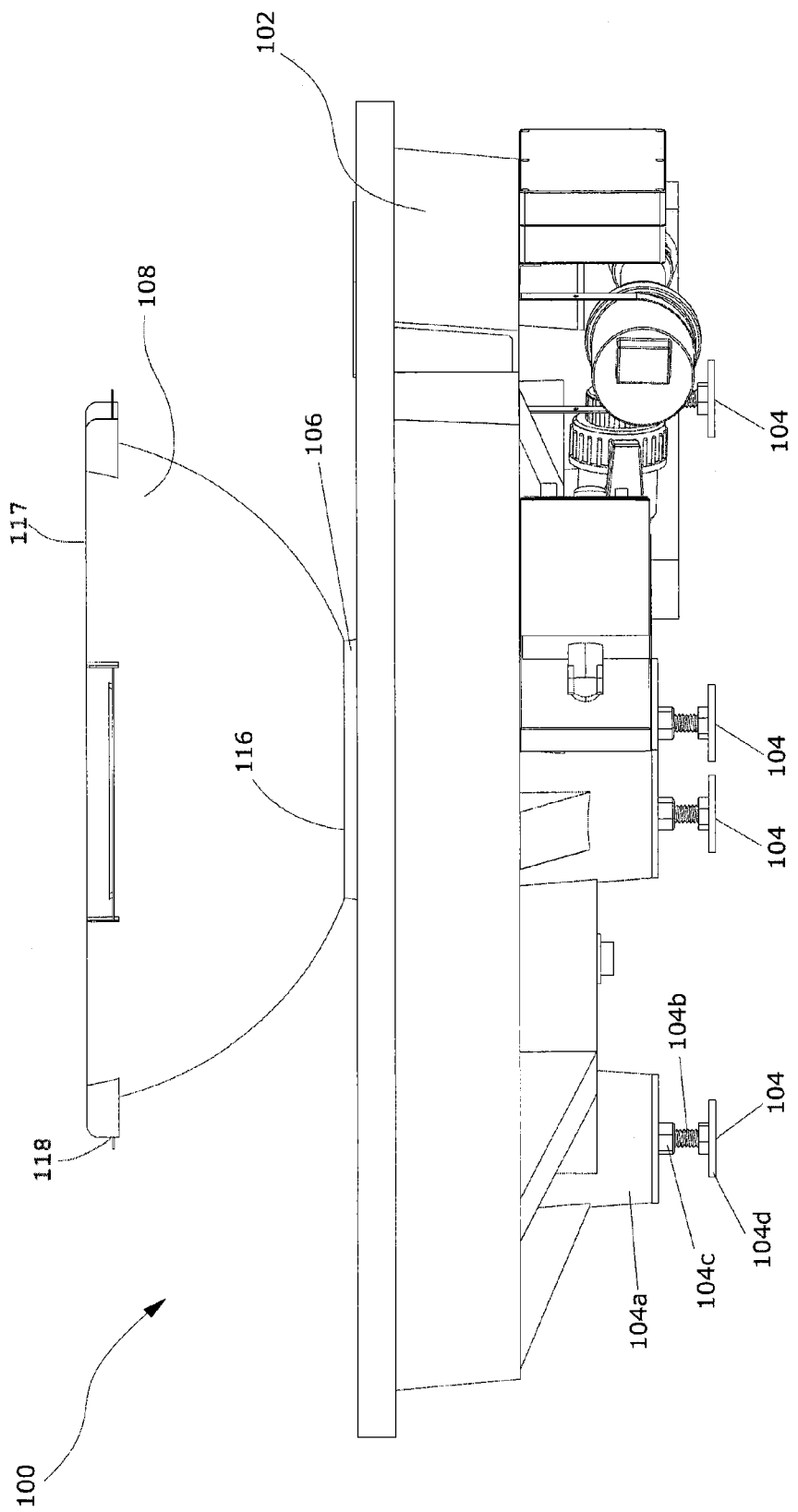
FIG. 4 is a side view of the water basin and system.

FIG. 4 is a side isometric view of the water basin and system 100 illustrating basin 102, tower 106, water feature 108 having first end 116 and second end 117 and a plurality of scuppers 118. In the illustrated embodiment, water basin 102 further includes four leveling supports 104. In the illustrated embodiment, each leveling support 104 extends downward from water basin 102 and includes flange 104a, post 104b, and leveling pad 104d. In the illustrated embodiment, flange 104a is integrally cast or molded with water basin 102. In another embodiment, the flange may be threaded or welded to the water basin. In the illustrated embodiment, post 104b is a threaded rod that at least partially threads into flange 104a and includes a threaded nut 104c, wherein the threaded rod or post 104b can be adjustably threaded into and out of the threaded nut to change or adjust the height of the leveling support so water basin and system 100 may be installed on rough or uneven support surfaces. In another embodiment, the threaded rod includes a lock nut. In yet another embodiment, post may be a notched post with preselected height locations or the post may be a shaft that is locked in place using another method known by one skilled in the art. In the illustrated embodiment, leveling pad 104d has a disk shape with a diameter configured to support the weight of the water basin and system 100. In another embodiment, the leveling pad pivots on the end of the leveling post to enable the leveling pad to further adjust to an uneven surface. In yet another embodiment, the leveling system may be made/molded with polyethylene or other materials. For example, it is possible to mold male and female threads with rotational or injection molding processes.

In the illustrated embodiment, the leveling supports 104 can be adjusted to the same or different heights to accommodate for even and/or uneven surfaces and support surfaces of varying elevations, heights, and the like. In the illustrated embodiment, four leveling supports 104 support the water basin and system 100. In another embodiment, more or less than four leveling supports support the water basin and system 100. In another embodiment, adjustable hydraulic leveling supports extend from the water basin.

While various embodiments of the present disclosure have been described above, it should be understood that they have been presented by the way of example only, and not limitation. It will be understood by those skilled in the art that various changes in form and details may be made therein without departing from the spirit and scope of the disclosure as defined. Thus, the breadth and scope of the present disclosure should not be limited by any of the above-described exemplary embodiments.

What is claimed is:

1. An apparatus comprising:
   a basin having a bottom, a sidewall, a plurality of leveling supports, a bottom side, a top side and a first passageway extending from said bottom side to said top side, wherein said plurality of leveling supports adjustably extend from said bottom side of said basin;
   a tower having a first end and a second end and a second passageway extending between said first end and said second end, wherein said tower extends upward from said bottom of said basin and said second passageway of said tower is substantially aligned with said first passageway of said basin;
   a water system having at least a pump, a first water line, a second water line, and a water filter housing, wherein said pump is securely connected to said bottom side of said basin, wherein said first water line extends from said pump through said first passageway of said basin to said second passageway of said tower, and wherein said second water line extends from said water filter housing to said pump; and
   an electrical system that controls at least said pump and said electric system is securely connected to said bottom side of said basin.

2. The apparatus of claim 1, further comprising a water outlet feature having at least one inlet and at least one scupper, wherein said water outlet feature is securely connected to said first end of said tower and said at least one inlet is fluidly connected to said first water line.

3. The apparatus of claim 2, further comprising a fire pit feature having a fuel system that includes a gas valve, a flame control system, and a gas line, wherein said fuel system is securely connected to said bottom side of said basin and said gas line extends from said fuel system through said second passageway.

4. The apparatus of claim 2, further comprising a fuel system that includes a gas valve, a flame control system, and a gas line, wherein said fuel system is securely connected to said bottom side of said basin and said gas line extends from said fuel system to said second passageway.

5. The apparatus of claim 1, further comprising a tank having a low level sensor, wherein said tank fluidly connects said basin to said pump.

6. The apparatus of claim 5, wherein said low level sensor is configured to at least turn off said pump at a low level setpoint.

7. The apparatus of claim 6, wherein said low level sensor is at least one of the following: a float sensor and a pressure transducer.

8. The apparatus of claim 1, further comprising a liner covering at least a portion of said bottom of said basin.

9. The apparatus of claim 1, wherein said water filter housing holds a reusable water filter.

10. A water basin and system comprising:
    a concave water basin having at least one tower extending upward from a bottom of said water basin, a bottom side, a top side, a plurality of leveling supports, and a passageway, wherein said passageway extends from said bottom side of said concave water basin through said tower, and wherein said plurality of leveling supports are adjustable from said bottom side of said concave water basin;
    a water system having at least a pump, at least a first water line, and a water filter housing, wherein said pump is securely connected to said concave water basin, wherein said at least first water line extends from below said bottom side of said concave water basin through at least said passageway; and
    an electrical system that controls at least said pump, wherein said electric system is securely connected to said concave water basin.

11. The water basin and system of claim 10, further comprising a water feature having at least one inlet and at least one outlet, wherein said water feature is securely connected to said tower and said at least one inlet is fluidly connected to said at least first water line.

12. The water basin and system of claim 10, further comprising at least one waterfall feature securely connected to said tower and configured to contain at least one of the following: a fire pit, a plant, a statue, a sound system, and a light system.

13. The water basin and system of claim 10, further comprising a low level sensor that is configured to at least turn off said pump at a setpoint.

14. The water basin and system of claim 10, wherein said plurality of leveling supports further include a plurality of leveling pads, wherein said plurality of leveling supports and said plurality of leveling pads can do at least one of the following to accommodate uneven support surfaces: pivot, extend, and retract.

15. The water basin and system of claim 10, wherein said water system further includes a water inlet valve and a drain plug.

16. The water basin and system of claim 10, wherein said concave water basin and said tower are integrally formed.

17. The water basin and system of claim 16, wherein said concave water basin and said tower are integrally formed by at least one of the following: casting, rotational molding, and injection molding.

18. A water system comprising:
- a first basin having a longitudinally upward extending tower, a first side, a second side, and a plurality of supports, wherein said plurality of supports are adjustable from said first side of said water basin;
- a water system having a pump, a water line, and a water filter, wherein said water line extends from said pump to said second side;
- a fuel system that includes a gas valve, a flame control system, and a gas line, wherein said fuel system is securely connected to said first side of said water basin and said gas line extends from said fuel system to said second side of said first basin; and
- an electrical system that controls at least said water system and said fuel system.

19. The water system of claim 18 further comprising a conduit forming a passageway, wherein said conduit extends from said first side to said second side of said basin, providing a passageway for at least one of the following: said water line and said gas line.

20. The water system of claim 19, wherein said conduit extends upwardly through said first basin.

\* \* \* \* \*